US007079963B2

(12) United States Patent
Gloor et al.

(10) Patent No.: US 7,079,963 B2
(45) Date of Patent: Jul. 18, 2006

(54) MODIFIED BINARY SEARCH FOR OPTIMIZING EFFICIENCY OF DATA COLLECTION TIME

(75) Inventors: Cary Gloor, Ft. Collins, CO (US); Robert Benware, Ft. Collins, CO (US); Robert Madge, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 466 days.

(21) Appl. No.: 10/412,867

(22) Filed: Apr. 14, 2003

(65) Prior Publication Data

US 2004/0205052 A1 Oct. 14, 2004

(51) Int. Cl.
*G01R 19/00* (2006.01)
(52) U.S. Cl. .................. 702/64; 702/179; 702/180; 702/181; 702/182
(58) Field of Classification Search .................. 702/64, 702/179–182
See application file for complete search history.

(56) References Cited

U.S. PATENT DOCUMENTS

| 5,057,774 | A | * | 10/1991 | Verhelst et al. | ............ 324/537 |
| 5,327,437 | A | * | 7/1994 | Balzer | ..................... 714/736 |
| 5,894,226 | A | * | 4/1999 | Koyama | .................... 324/765 |
| 6,031,386 | A | * | 2/2000 | Cole et al. | ................ 324/765 |
| 6,185,552 | B1 | * | 2/2001 | DeLong et al. | ................ 707/3 |
| 6,472,239 | B1 | * | 10/2002 | Hembree et al. | ............ 438/18 |
| 6,682,947 | B1 | * | 1/2004 | Madge | ......................... 438/14 |
| 6,716,648 | B1 | * | 4/2004 | Iriki | ............................ 438/14 |
| 6,954,705 | B1 | * | 10/2005 | Benware | ...................... 702/64 |
| 2002/0129189 | A1 | * | 9/2002 | Lin et al. | ....................... 711/1 |
| 2003/0115017 | A1 | * | 6/2003 | Sun et al. | .................. 702/181 |
| 2003/0236774 | A1 | * | 12/2003 | Andreev et al. | ............... 707/3 |
| 2004/0010763 | A1 | * | 1/2004 | Madge | ......................... 716/4 |
| 2004/0076067 | A1 | * | 4/2004 | Andreev et al. | ........... 365/232 |
| 2004/0117596 | A1 | * | 6/2004 | Henry et al. | ................ 711/221 |
| 2004/0205052 | A1 | * | 10/2004 | Gloor et al. | .................. 707/3 |
| 2005/0076035 | A1 | * | 4/2005 | Lin et al. | ..................... 707/10 |
| 2005/0125468 | A1 | * | 6/2005 | Enenkel | ...................... 708/200 |

* cited by examiner

*Primary Examiner*—Marc S. Hoff
*Assistant Examiner*—Phuong Huynh
(74) *Attorney, Agent, or Firm*—Fitch, Even, Tabin & Flannery

(57) ABSTRACT

A method for a modified binary search includes steps of: selecting a parameter having a distribution of values, selecting a probability density function representative of the distribution of values of the selected parameter, defining a substantially equal probability weighted binary test interval from the probability density function for each of a selected number of test intervals over a selected test range, translating the weighted binary test intervals to obtain a highest resolution at a target point of the selected parameter, and skewing the translated and weighted binary test intervals by a selected scaling function to generate a modified binary test interval for each of the selected number of test intervals over the selected test range.

20 Claims, 4 Drawing Sheets

| n Test Interval | CDF | Weighted Values | Shifted Values | d(n) Interval Deltas | d(n) Skewed Deltas | Modified Binary Intervals | Standard Binary Intervals |
|---|---|---|---|---|---|---|---|
| 0 | 0.0156 | 1.28469 | 1.36869 | 0.00000 | 0.0000 | 1.2000 | 1.2000 |
| 1 | 0.0469 | 1.29807 | 1.38207 | 0.01338 | 0.0518 | 1.2518 | 1.2194 |
| 2 | 0.0781 | 1.30530 | 1.38930 | 0.00723 | 0.0280 | 1.2797 | 1.2387 |
| 3 | 0.1094 | 1.31056 | 1.39456 | 0.00526 | 0.0204 | 1.3001 | 1.2581 |
| 4 | 0.1406 | 1.31483 | 1.39883 | 0.00427 | 0.0165 | 1.3166 | 1.2774 |
| 5 | 0.1719 | 1.31849 | 1.40249 | 0.00366 | 0.0142 | 1.3307 | 1.2968 |
| 6 | 0.2031 | 1.32175 | 1.40575 | 0.00326 | 0.0126 | 1.3433 | 1.3161 |
| 7 | 0.2344 | 1.32471 | 1.40871 | 0.00297 | 0.0115 | 1.3548 | 1.3355 |
| 8 | 0.2656 | 1.32747 | 1.41147 | 0.00276 | 0.0107 | 1.3654 | 1.3548 |
| 9 | 0.2969 | 1.33006 | 1.41406 | 0.00260 | 0.0100 | 1.3755 | 1.3742 |
| 10 | 0.3281 | 1.33254 | 1.41654 | 0.00247 | 0.0096 | 1.3850 | 1.3935 |
| 11 | 0.3594 | 1.33492 | 1.41892 | 0.00238 | 0.0092 | 1.3942 | 1.4129 |
| 12 | 0.3906 | 1.33722 | 1.42122 | 0.00231 | 0.0089 | 1.4032 | 1.4323 |
| 13 | 0.4219 | 1.33948 | 1.42348 | 0.00226 | 0.0087 | 1.4119 | 1.4516 |
| 14 | 0.4531 | 1.34170 | 1.42570 | 0.00222 | 0.0086 | 1.4205 | 1.4710 |
| 15 | 0.4844 | 1.34390 | 1.42790 | 0.00220 | 0.0085 | 1.4290 | 1.4903 |
| 16 | 0.5156 | 1.34610 | 1.43010 | 0.00219 | 0.0133 | 1.4423 | 1.5097 |
| 17 | 0.5469 | 1.34830 | 1.43230 | 0.00220 | 0.0133 | 1.4556 | 1.5290 |
| 18 | 0.5781 | 1.35052 | 1.43452 | 0.00222 | 0.0134 | 1.4690 | 1.5484 |
| 19 | 0.6094 | 1.35278 | 1.43678 | 0.00226 | 0.0136 | 1.4826 | 1.5677 |
| 20 | 0.6406 | 1.35508 | 1.43908 | 0.00231 | 0.0139 | 1.4966 | 1.5871 |
| 21 | 0.6719 | 1.35746 | 1.44146 | 0.00238 | 0.0144 | 1.5109 | 1.6065 |
| 22 | 0.7031 | 1.35994 | 1.44394 | 0.00247 | 0.0149 | 1.5259 | 1.6258 |
| 23 | 0.7344 | 1.36253 | 1.44653 | 0.00260 | 0.0157 | 1.5415 | 1.6452 |
| 24 | 0.7656 | 1.36529 | 1.44929 | 0.00276 | 0.0166 | 1.5582 | 1.6645 |
| 25 | 0.7969 | 1.36825 | 1.45225 | 0.00297 | 0.0179 | 1.5761 | 1.6839 |
| 26 | 0.8281 | 1.37151 | 1.45551 | 0.00326 | 0.0197 | 1.5958 | 1.7032 |
| 27 | 0.8594 | 1.37517 | 1.45917 | 0.00366 | 0.0221 | 1.6179 | 1.7226 |
| 28 | 0.8906 | 1.37944 | 1.46344 | 0.00427 | 0.0258 | 1.6437 | 1.7419 |
| 29 | 0.9219 | 1.38470 | 1.46870 | 0.00526 | 0.0318 | 1.6755 | 1.7613 |
| 30 | 0.9531 | 1.39193 | 1.47593 | 0.00723 | 0.0437 | 1.7191 | 1.7806 |
| 31 | 0.9844 | 1.40531 | 1.48931 | 0.01338 | 0.0809 | 1.8000 | 1.8000 |
|  |  |  |  | 0.12062 | 0.6000 |  |  |
|  |  |  | DL= | 0.05921 |  |  |  |
|  |  |  | DU= | 0.06141 |  |  |  |

*FIG._1*

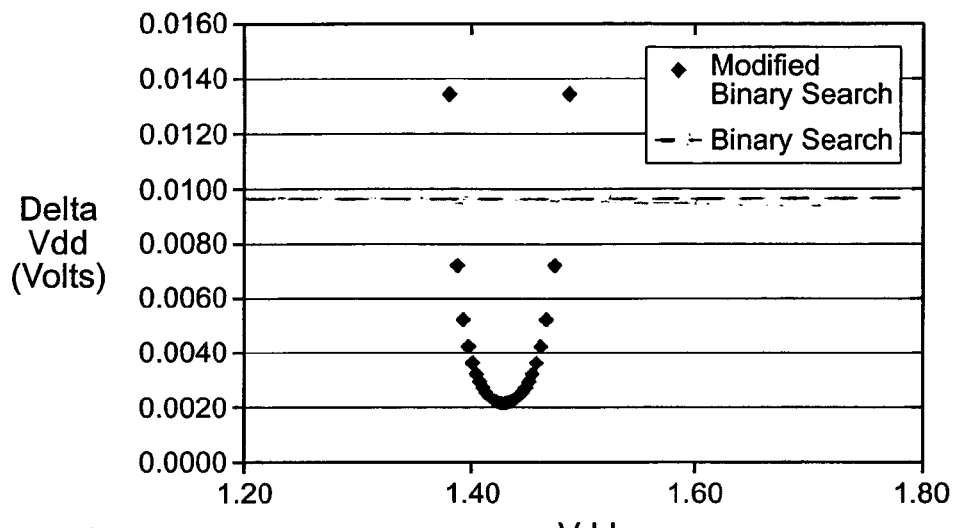
FIG._2
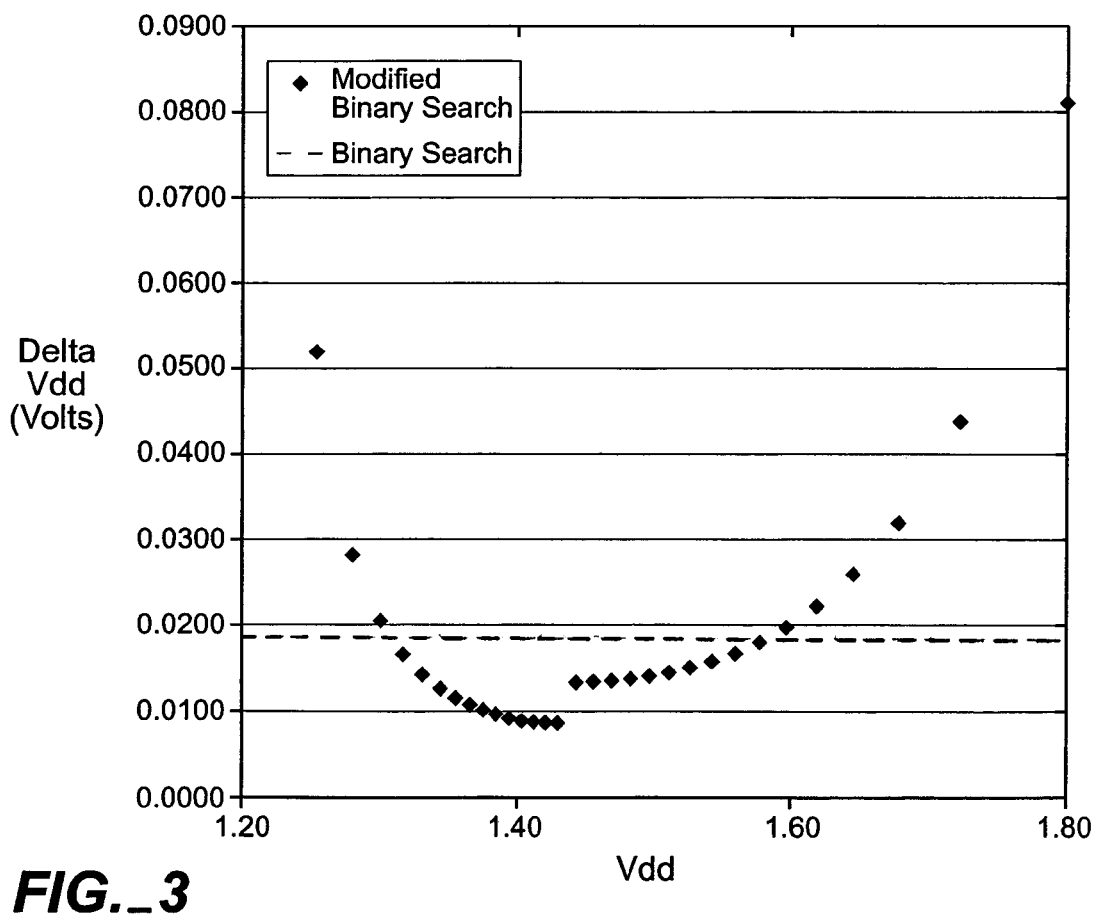
FIG._3

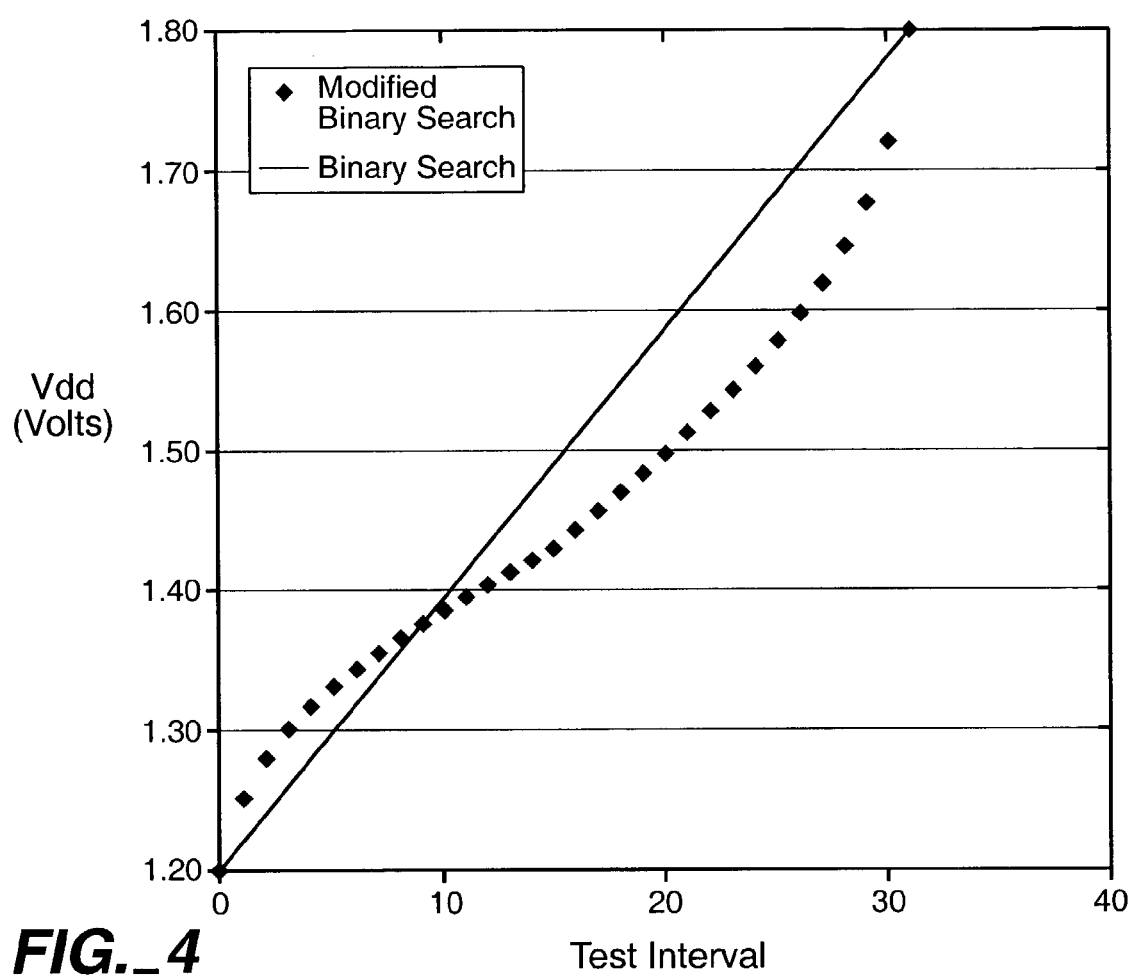
FIG._4

MODIFIED BINARY SEARCH FOR OPTIMIZING EFFICIENCY OF DATA COLLECTION TIME

BACKGROUND OF THE INVENTION

1. Field of the Invention

The present invention relates to techniques for screening integrated circuit dies during the manufacturing process. More specifically, but without limitation thereto, the present invention relates to statistical methods for screening integrated circuit dies by collecting data for parametric variables to determine a pass/fail point.

2. Description of the Prior Art

In the manufacture of integrated circuits, a large number of dies are typically formed on a semiconductor wafer. Many of these dies have defects that occur during the fabrication process, and it is desirable to detect and remove defective die from a lot before the added expense of packaging the dies into complete integrated circuits.

Normal process variations generally produce an intrinsic probability distribution for a measured parameter, for example, Vdd(min) and IDDQ. A defect may be detected by its effect on the measured parameter. For example, a short between transistors may result in an increase in quiescent current (IDDQ) that differs significantly from a mean value of quiescent current for the non-defective dies on the wafer. Other defects may be detected by a change in the minimum supply voltage Vdd(min) required by a die to meet performance specifications. The supply voltage below which a die fails to meet performance specifications is called the pass/fail point.

Previous approaches to determine the pass/fail point for an integrated circuit die typically use a standard binary search. In a standard binary search, the search range is divided into a number of equal intervals depending on the desired resolution. For example, if Vdd(min) is to be measured over the range from 1.20 V to 1.80 V with a resolution of 0.01 V, then the number of test intervals N is given by $(1.8-1.2)/(0.01)=60$. The number of binary search steps I is given by rounding the value of $\log_2 N$ to the next highest integer. In this example, $\log_2 60=5+$, therefore I=6. A maximum of six steps are therefore needed to arrive at any interval within the test range from either end of the test range.

SUMMARY OF THE INVENTION

In one aspect of the present invention, a method for a modified binary search includes steps of:

(a) selecting a parameter having a distribution of values;

(b) selecting a probability density function representative of the distribution of values of the selected parameter;

(c) defining a substantially equal probability weighted binary test interval from the probability density function for each of a selected number of test intervals over a selected test range;

(d) translating the weighted binary test intervals to obtain a highest resolution at a target point of the selected parameter; and (e) skewing the translated and weighted binary test intervals by a selected scaling function to generate a modified binary test interval for each of the selected number of test intervals over the selected test range.

In another aspect of the present invention, a computer program product for a modified binary search includes:

a medium for embodying a computer program for input to a computer; and a computer program embodied in the medium for causing the computer to perform steps of:

(a) selecting a parameter having a distribution of values;

(b) selecting a probability density function representative of the distribution of values of the selected parameter;

(c) defining a substantially equal probability weighted binary test interval from the probability density function for each of a selected number of test intervals over a selected test range;

(d) translating the weighted binary test intervals to obtain a highest resolution at a target point of the selected parameter; and (e) skewing the translated and weighted binary test intervals by a selected scaling function to generate a modified binary test interval for each of the selected number of test intervals over the selected test range.

BRIEF DESCRIPTION OF THE DRAWINGS

The present invention is illustrated by way of example and not limitation in the accompanying figures, in which like references indicate similar elements throughout the several views of the drawings, and in which:

FIG. 1 illustrates a table of binary search intervals according to an embodiment of the present invention for a Gaussian distribution;

FIG. 2 illustrates a graph of the binary test point intervals in FIG. 1 after weighting and shifting to a selected parameter value target point;

FIG. 3 illustrates a graph of the weighted and shifted binary test intervals of FIG. 2 after skewing to generate the modified binary search intervals covering the desired test range;

FIG. 4 illustrates a graph of applied voltage vs. binary test interval for the modified binary test intervals of FIG. 3.

Figure 5:
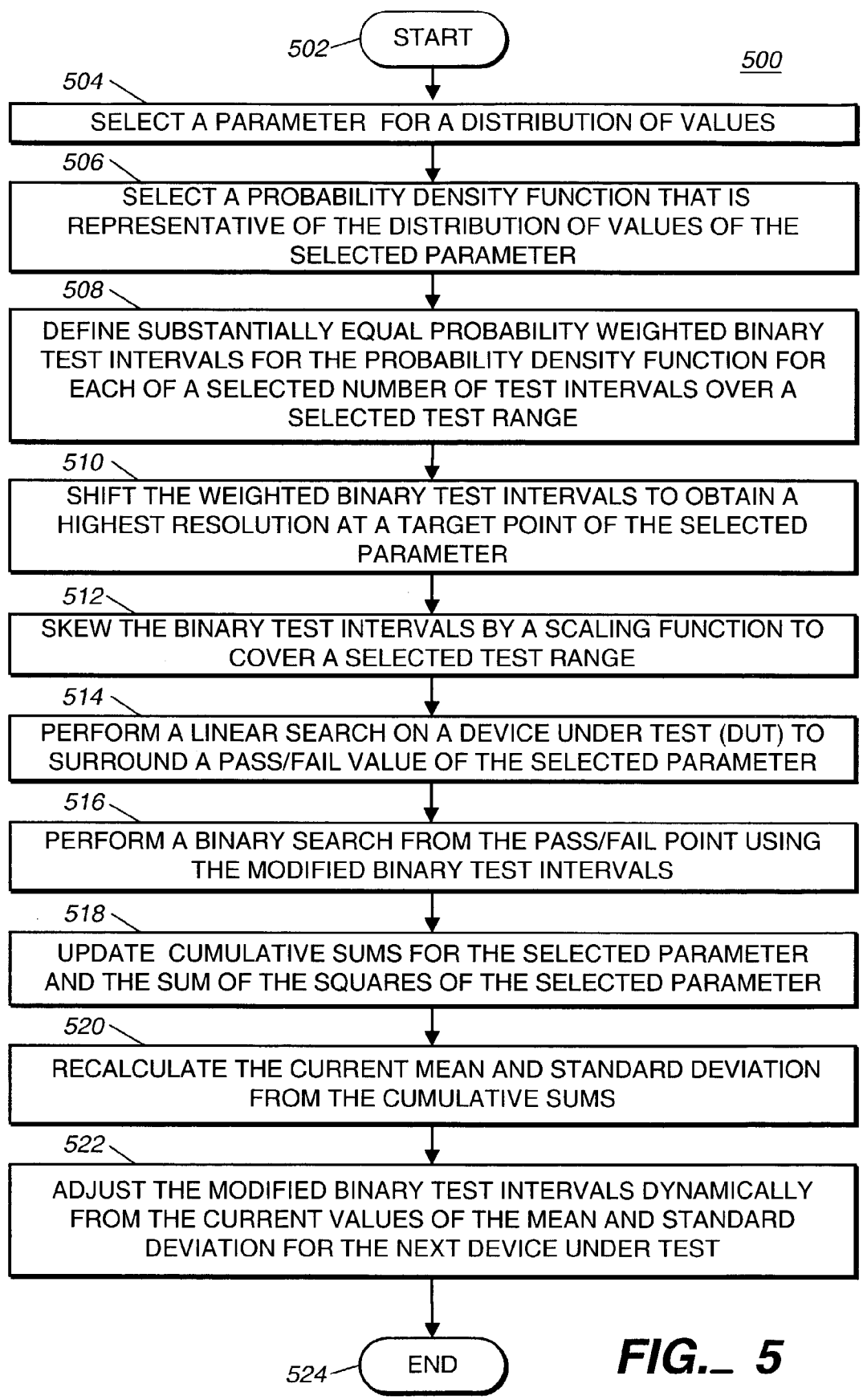
FIG. 5 illustrates a flow chart of a modified binary search function according to an embodiment of the present invention.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

Reducing semiconductor die test time is an important factor in controlling manufacturing costs, and becomes increasingly important as the cost of test time per second escalates with the cost of more expensive automatic test equipment (ATE). In addition, engineering data collection continues to be an important part of testing costs as failure analysis relies more on signature information to direct the root cause of failure analysis effort.

A disadvantage of using the standard binary search to determine a pass/fail point for an integrated circuit die is that the standard binary search does not take advantage of the probability density of the parameter of interest, which may often be accurately modeled from prior data. For example, a distribution of Vdd(min) test sample data may generally be modeled as a Gaussian distribution having outliers on the high end of the data range. Also, previous approaches to searching test data do not recognize that the resolution for the outliers does not have to be as fine as for other points of the distribution. Furthermore, the previous approaches do not exploit real-time test data that might significantly improve the probability of starting the search near the expected result. Consequently, valuable test time is lost and unnecessary testing costs are incurred due to inefficient testing to determine the pass/fail value of Vdd(min) for an integrated circuit die. The present invention advantageously reduces the testing time needed to collect data for parametric variables that require a search approach to find the pass/fail value of the selected parameter. Although the method for a modified binary search of the present invention is illustrated in the context of semiconductor testing, the present invention may also be practiced in other applications not necessarily related to semiconductor testing within the scope of the appended claims.

In one aspect of the present invention, a method for a modified binary search includes steps of:

(a) selecting a parameter having a distribution of values;

(b) selecting a probability density function representative of the distribution of values of the selected parameter;

(c) defining substantially equal probability weighted binary test intervals from the probability density function;

(d) translating the weighted binary test intervals to obtain a highest resolution at a target point of the selected parameter; and (e) skewing the translated and weighted binary test intervals by a scaling function to generate a plurality of modified binary test intervals over a selected test range.

An example of a parameter of interest that may be modeled from prior data is Vdd(min), the minimum supply voltage at which an integrated circuit die operates within performance specifications. Using prior data or an expected distribution, a probability density function is selected that adequately models the selected parameter's distribution.

FIG. 1 illustrates a table of binary search intervals according to an embodiment of the present invention for a Gaussian distribution. In the example of FIG. 1, the number of test intervals selected to provide a resolution of 0.01 V over a range of Vdd(min) from 1.20 V to 1.80 V is equal to 32. The Vdd(min) values in the example of FIG. 1 have a Gaussian distribution with a mean of 1.345 V and a standard deviation of 0.028 V with outliers on the high end of the data range observed from sample data.

A weighted binary search may be defined from the cumulative distribution function equal probability interval that is equal to the mid-point of one divided by the number of test intervals. For example, the cumulative distribution function equal probability interval for the first of the 32 test intervals in the first column of the table is the mid-point of $1/32=0.0313/2=0.0156$. The mid-point of each subsequent test interval is 0.0313 greater than the previous test interval as illustrated in the second column of the table. For a Gaussian distribution, the cumulative distribution function (CDF) is given by:

$$\Phi[(X-\text{mean})/(\text{standard deviation})] \quad (1)$$

where X is the value of the selected parameter. The number of binary search steps S may be expressed by the formula:

$$S = K * \log_2\left(\frac{\text{range}}{\text{resolution}}\right) \quad (2)$$

where K is a selected constant having a value, for example, equal to 0.8 so that the number of test intervals is selected to provide the desired resolution. By way of example, if Vdd(min) is to be measured over a range of 1.20 V to 1.80 V with a resolution of 0.01 V, then $0.8*\log_2(0.6/0.01) = 0.8*\log_2(60)=0.8*6=5$ search steps are needed. The number of binary test intervals is given by $2^S$, or 32 in this example.

The inverse of the normal cumulative distribution is then calculated, which covers a range of parameter values after weighting of 1.28469 V to 1.40531 V as shown in the third column in the table of FIG. 1. Given the mean and the standard deviation of the distribution, the values for the inverse normal function may be obtained through built-in functions included with commercially available computer applications software using well-known iterative techniques for calculating the inverse normal function. Alternatively, there are well-known non-iterative techniques for estimating the inverse normal function. The best case resolution is about 0.003 V, which is significantly better than the resolution of a standard binary search using six search steps. Other functions may be used to generate a minimum test interval size near the mean value of the selected parameter and an increasing test interval size away from the mean value to practice various embodiments of the invention within the scope of the appended claims.

After determining the number of test intervals and the weighted binary test interval corresponding to each of the test intervals, the binary test intervals are shifted or translated across the Vdd axis so that the binary test interval corresponding to the fiftieth percentile of the cumulative distribution function is aligned with a selected parameter value in order to obtain the highest resolution at the target point. For the Vdd(min) parameter, the selected parameter value is preferably the sample mean plus three standard deviations. In this example, the selected parameter value for optimum resolution, or target point, is (1.345 V+3*0.028 V)=1.429 V. The new range of parameter values is shifted from 1.369 V to 1.489 V as shown in the fourth column of the table in FIG. 1.

FIG. 2 illustrates a graph of the binary test point intervals in FIG. 1 after weighting and shifting to a target point of the selected parameter Vdd(min). As may be appreciated from the graph of FIG. 1, the binary test interval size ΔVdd grows larger with distance from the target point of 1.429. The constant test interval size of a standard binary search is also shown for comparison to illustrate the advantageously increased resolution of the weighted binary test intervals of the weighted binary test intervals near the target point.

After weighting and shifting the binary test point intervals to the target point of the selected parameter, the shifted and weighted binary test intervals are skewed to generate modified binary test intervals that fully cover the desired test range. The skewing may be performed, for example, by scaling each of the differences d(n) between consecutive binary test intervals n shown in the fifth column of the table in FIG. 1 according to the formula:

$$d'(n) = \begin{cases} d(n) * \dfrac{(\text{target-point} - \text{range(min)})}{\sum_{0}^{15} d(n)} & \text{if } 0 \leq n \leq 15 \\[2ex] d(n) * \dfrac{(\text{range(max)}) - (\text{target-point})}{\sum_{16}^{31} d(n)} & \text{if } 16 \leq n \leq 31 \end{cases} \quad (4)$$

wherein d'(n) is a difference between two consecutive modified binary test intervals n and n−1, d(n) is a difference between two consecutive translated and weighted binary test intervals n and n−1, range(min) is a minimum value in the selected test range, range(max) is a maximum value in the selected test range, and target-point is a mid-point in the shifted test range. In this example, range(min) is equal to 1.20 V, range(max) is equal to 1.80 V, and target-point is equal to 1.429 V.

The sixth column in the table of FIG. 1 shows the values of the differences d'(n) between consecutive skewed binary test intervals calculated from formula (3). The seventh column in the table shows the values of Vdd incremented by each of the differences d'(n) over the selected test range. In this example, the best case resolution near the target point is about 0.00085 V. The eighth column in the table illustrates standard constant binary search intervals calculated according to previous techniques.

FIG. 3 illustrates a graph of the weighted and shifted binary test intervals of FIG. 2 after skewing to generate the modified binary search intervals covering the desired test range. The constant test interval size of a standard binary search illustrated in the eighth column of the table in FIG. 1 is also shown for comparison.

FIG. 4 illustrates a graph of applied voltage vs. binary test interval for the modified binary test intervals of FIG. 3. The linear test interval spacing used by traditional binary search methods is also shown for comparison to illustrate the superior coverage of the test range by the modified binary test intervals. The non-linear test interval spacing of the modified binary search intervals decreases the resolution of the test intervals furthest away from the target point and increases resolution of the test intervals closest to the target point. As a result, the target point resolution is increased while reducing the number of search steps.

Before applying the modified binary search algorithm in testing a die, a standard linear search may be performed to further reduce the number of search steps using an initial spacing I as expressed by the formula:

$$I = \log_2\left(\frac{6*SD}{\text{resolution}}\right) \quad (5)$$

In this example, $I=\log_2(6*0.028/0.01)=\log_2(16.8)=4$ binary search intervals. The linear search preferably proceeds in steps of I binary search intervals from the test interval corresponding to the sample mean minus one standard deviation, for example, from test interval 4 in the table of FIG. 1 to test interval (4+4)=8, and so on, until the pass/fail point is surrounded. A binary search is then performed using the modified binary search intervals to find Vdd(min) for the device under test (DUT).

The number of search steps required to find Vdd(min) may be further reduced as follows. A cumulative total of the Vdd(min) values and the sum of the Vdd(min) squared values may be saved for each wafer during a test run. Samples that fall outside of the current sample mean and six sigma range are considered outliers and are omitted from the cumulative calculation. This is done by excluding any new value that is less than the sample mean minus three times the sample standard deviation or greater than the sample mean plus three times the sample standard deviation. From these two statistics, the mean and standard deviation may be calculated continuously to feed forward to the next device under test. The test intervals and the starting point for the next device under test are dynamically adjusted according to the current values of the mean and standard deviation, and the process is repeated for each device under test.

Alternatively, other values may be used to feed forward a starting point and test intervals to the next device under test, for example, a single value from a previous search, a mean of values from previous searches, or one or more nearest neighbor values from previous searches.

Further improvements in the test time may be achieved by taking advantage of the reduced test time required to apply a failing test interval compared to a passing test interval. Empirical data may be used to define the optimum starting interval instead of the mean minus one standard deviation.

FIG. 5 illustrates a flow chart 500 for a modified binary search function according to an embodiment of the present invention.

Step 502 is the entry point of the flow chart 100.

In step 504, a parameter is selected for a distribution of values, for example, Vdd(min) for each die of a semiconductor wafer.

In step 506, a probability density function is selected that is representative of the distribution of values of the selected parameter, for example, a Gaussian function.

In step 508, substantially equal probability weighted binary test intervals are defined for the probability density function for each of a selected number of test intervals over a selected test range, that is, the size of the test interval at each corresponding parameter value is chosen so that the probability that a test sample will occur in one binary test interval is equal to the probability that the test sample will occur in any other of the binary test intervals in the selected test range.

In step 510, the weighted binary test intervals are shifted to obtain a highest resolution at a target point of the selected parameter, for example, the mean plus three standard deviations for testing Vdd(min).

In step 512, the binary test intervals are skewed by a scaling function to cover a selected test range. The scaling function may be that of formula (3) above or any other scaling function to suit specific applications.

In step 514, a linear search is performed on a device under test (DUT) to surround a pass/fail value of the selected parameter using a selected number of binary search intervals for each step of the linear search starting from a selected starting interval. For example, the starting interval may be the test interval closest to the mean minus one standard deviation, and the selected number of binary search intervals may be found from formula (4) above.

In step 516, a binary search is performed from the pass/fail point using the modified binary test intervals generated in step 512.

In step 518, a first cumulative sum of values of the selected parameter and a second cumulative sum of squares of values of the selected parameter are updated.

In step 520, the current mean and standard deviation are recalculated from the first and second cumulative sums.

In step 522, the modified binary test intervals are dynamically adjusted from the current values of the mean and standard deviation calculated in step 518 for the next device under test.

Step 524 is the exit point of the flow chart 500.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

In another aspect of the present invention, the method illustrated in the flowchart description above may be embodied in a computer program product and implemented by a computer according to well known programming techniques to perform the following functions:

(a) selecting a parameter having a distribution of values;

(b) selecting a probability density function representative of the distribution of values of the selected parameter;

(c) defining substantially equal probability weighted binary test intervals from the probability density function;

(d) translating the weighted binary test intervals to obtain a highest resolution at a target point of the selected parameter; and (e) skewing the translated and weighted binary test intervals by a scaling function to generate a plurality of modified binary test intervals over a selected test range.

While the invention herein disclosed has been described by means of specific embodiments and applications thereof, numerous modifications and variations may be made thereto by those skilled in the art without departing from the scope of the invention set forth in the following claims.

What is claimed is:

1. A method comprising steps of:
    (a) receiving as input a distribution of values measured for a selected parameter;
    (b) selecting a probability density function representative of the distribution of values measured for the selected parameter;
    (c) defining a substantially equal probability weighted binary test interval from the probability density function for each of a selected number of test intervals over a selected test range of the selected parameter;
    (d) translating the weighted binary test intervals to obtain a highest resolution at a target point of the selected parameter; and
    (e) skewing the translated and weighted binary test intervals by a selected scaling function; and
    (f) generating as output the translated and weighted binary test intervals over the selected test range for the distribution of values measured for the selected parameter.

2. The method of claim 1 further comprising a step of performing a linear search on a device under test to surround a pass/fail value of the selected parameter wherein each linear test interval includes a selected number of the translated and weighted binary test intervals.

3. The method of claim 2 further comprising a step of starting the linear search from a selected starting interval.

4. The method of claim 2 further comprising a step of performing a binary search from the surrounded pass/fail point using the translated and weighted binary test intervals.

5. The method of claim 1 further comprising a step of maintaining a first cumulative sum of values of the selected parameter and a second cumulative sum of squared values of the selected parameter.

6. The method of claim 5 further comprising a step of recalculating a mean and a standard deviation of the distribution of the selected parameter from the first cumulative sum and the second cumulative sum for a next device under test.

7. The method of claim 6 further comprising a step of dynamically adjusting the translated and weighted binary test intervals for each device under test from the recalculated mean and standard deviation.

8. The method of claim 1 wherein step (b) comprises selecting a Gaussian distribution function.

9. The method of claim 1 wherein the selected scaling function is given substantially by the formula:

$$d'(n) = \begin{cases} d(n) * \dfrac{(\text{target-point} - \text{range(min)})}{\sum_{0}^{15} d(n)} & \text{if } 0 \leq n \leq 15 \\ d(n) * \dfrac{(\text{range(max)} - \text{target-point})}{\sum_{16}^{31} d(n)} & \text{if } 16 \leq n \leq 31 \end{cases}$$

wherein d'(n) is a difference between two consecutive modified binary test intervals, n is a corresponding one of the selected number of test intervals, d(n) is a difference between two translated and weighted binary test intervals, range(min) is a minimum value in the selected test range, range(max) is a maximum value in the selected test range, and range(target-point) is a target point in the selected test range.

10. The method of claim 1 further comprising a step (f) of feeding forward a starting point and test intervals to a next device under test from one of a single value of a previous search, a mean of values from previous searches, and a nearest neighbor value from a previous search.

11. A computer program product comprising:
    a medium for embodying a computer program for input to a computer; and
    a computer program embodied in the medium for causing the computer to perform steps of:
    (a) receiving as input a distribution of values measured for a selected parameter;
    (b) selecting a probability density function representative of the distribution of values measured for the selected parameter;
    (c) defining a substantially equal probability weighted binary test interval from the probability density function for each of a selected number of test intervals over a selected test range of the selected parameter;
    (d) translating the weighted binary test intervals to obtain a highest resolution at a target point of the selected parameter; and
    (e) skewing the translated and weighted binary test intervals by a selected scaling function; and
    (f) generating as output the translated and weighted binary test intervals over the selected test range for the distribution of values measured for the selected parameter.

12. The computer program product of claim 11 further comprising a step of performing a linear search on a device under test to surround a pass/fail value of the selected parameter wherein each linear test interval includes a selected number of the translated and weighted binary test intervals.

13. The computer program product of claim 12 further comprising a step of starting the linear search from a selected starting interval.

14. The computer program product of claim 13 further comprising a step of performing a binary search from the surrounded pass/fail point using the translated and weighted binary test intervals.

15. The computer program product of claim 11 further comprising a step of maintaining a cumulative sum of the selected parameter and a cumulative sum of the squared values of the selected parameter.

16. The computer program product of claim 15 further comprising a step of recalculating a mean and a standard deviation of the distribution of the selected parameter from the cumulative sum of the selected parameter and the cumulative sum of the squared values of the selected parameter.

17. The computer program product of claim 16 further comprising a step of dynamically adjusting the translated and weighted binary test intervals for each device under test from the recalculated mean and standard deviation.

18. The computer program product of claim 11 wherein step (b) comprises selecting a Gaussian distribution function.

19. The computer program product of claim 11 wherein the selected scaling function is given substantially by the formula:

$$d'(n) = \begin{cases} d(n) * \dfrac{(\text{target-point} - \text{range(min)})}{\sum_{0}^{15} d(n)} & \text{if } 0 \leq n \leq 15 \\ d(n) * \dfrac{(\text{range(max)} - \text{target-point})}{\sum_{16}^{31} d(n)} & \text{if } 16 \leq n \leq 31 \end{cases}$$

wherein d'(n) is a difference between two consecutive modified binary test intervals n and n−1, d(n) is a difference between two consecutive translated and weighted binary test intervals n and n−1, range(min) is a minimum value in the selected test range, range(max) is a maximum value in the selected test range, and range(target-point) is a target point in the selected test range.

20. The computer program product of claim 11 further comprising a step of feeding forward a starting point and the test intervals to a next device under test from one of a single value of a previous search, a mean of values from previous searches, and a nearest neighbor value from a previous search.

* * * * *